2,713,700

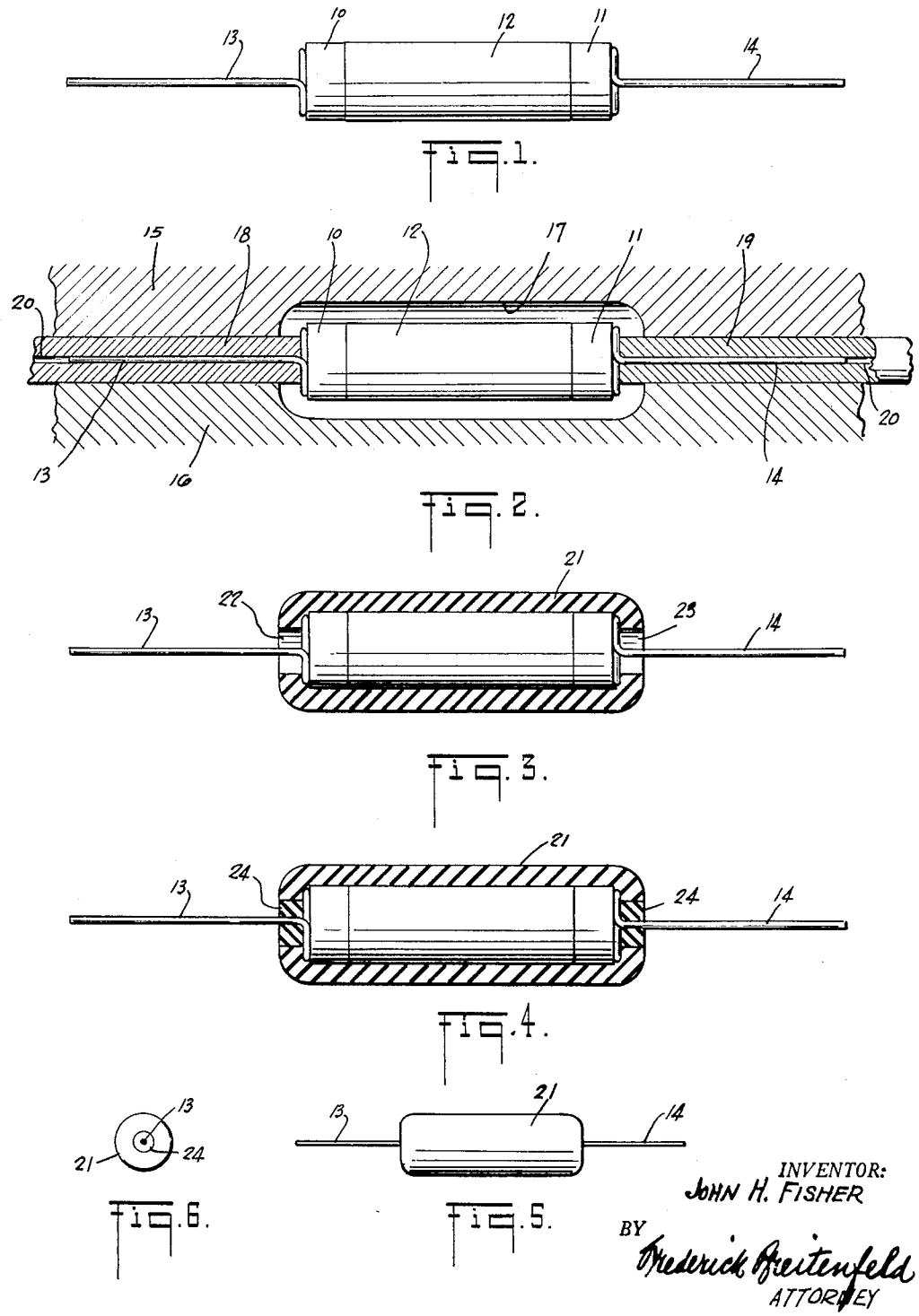

METHOD OF PRODUCING SEALED CAPACITORS

John H. Fisher, Scotch Plains, N. J., assignor to Astron Corporation, East Newark, N. J., a corporation of New Jersey Application September 17, 1952, Serial No. 310,079

4 Claims. (Cl. 18—59)

This invention relates generally to electrical capacitors, and has particular reference to improvements in a sealed capacitor unit of the plastic-encased type, and to certain procedural innovations involved in its manufacture.

The well-known capacitor to which my invention is primarily directed consists of a condenser body, usually composed of interwound strips of a conductor such as metal foil and an insulator such as paper, snugly encased within a shell or enclosure of plastic material. The enclosure shields the body against entry of air and moisture, and also prevents escape of the dielectric substance with which the body is impregnated. Metallic connectors project out of the enclosure, and it is of course desirable that the bonding of the plastic casing to the connectors, where they emerge, be tight and permanent and leak-proof.

In seeking to insure a tight bond between the projecting connectors and the plastic enveloping them, it has been common practice to employ plastic materials which have a low temperature coefficient of expansion and an ability to adhere well to the connectors. Typical of such plastics are the phenol-formaldehyde resins, and other resins of this series such as the melamine-formaldehydes and the urea-formaldehydes. The trouble with such resins is that they require high molding pressures, of the order of 5,000 pounds per square inch, or more, and such pressures are highly injurious to the condenser body around which the enclosure is being molded. Deformation of the body with consequent impairment of its electrical properties, is quite common in commercial practice, resulting in a high percentage of imperfect products. To overcome this, several expedients have been resorted to, among which are an increase of the thickness of the insulating paper or other dielectric spacing layer to an undesirable degree, or the employment of a spacer of unusually moist character so as to render it yieldable and more resistant to the pressures employed.

My present invention aims to overcome these difficulties and disadvantages, and has for its principal object the enclosure of the condenser body within a protective plastic medium whose molding requires no injuriously high pressures, which bonds firmly and in leakproof fashion to the projecting connectors, and whose temperature coefficient of expansion in the critical regions is in a desirably low range. Moreover, the application of the present improved enclosure is quicker and calls for no unusual or expensive departures from conventional manufacturing practice.

The improved procedure enables me to mold around the condenser body a plastic material which is chosen without regard to its temperature coefficient of expansion and primarily for its ability to set quickly and to be molded at a relatively low pressure uninjurious to the condenser body. This desirable result is made possible by so controlling the molding that the body is completely enclosed except for annular openings surrounding the projecting connectors, and by plugging these openings at a later stage with a plastic material of different type, deliberately chosen for its low coefficient of expansion, its ability to set without applied presssure of any kind, and its bonding characteristics which cause it to adhere well to the first plastic material and to the connectors themselves.

A particular feature of my invention stems from the fact that this two-stage method of encasing the condenser body affords a further and important advantage in that the drying of the body and its impregnation with a suitable dielectric substance (treatments well-known per se) may be accomplished after the molding of the principal plastic enclosure, since the openings left in the enclosure where the connectors emerge afford access to the encased condenser body. This drying and impregnation of the body after it has been encased avoids the disadvantages of impregnating the body before the molding procedure, among which are the impairment of the impregnated body due to handling, and due to its exposure to the air after impregnation and before final encasement.

One way of achieving the foregoing objects and advantages is illustrated in the accompanying drawings in which:

Figure 1 is a side view of a typical cylindrical condenser body whose encasement in a plastic enclosure produces a capacitor of the character mentioned;

Figure 2 is a view showing the body of Figure 1 mounted in a suitable mold;

Figure 3 is a view of the condenser body after it has been encased in a molded enclosure, the enclosure being shown in cross section;

Figure 4 is a view similar to Figure 3 with the openings in the enclosure plugged to produce the final product;

Figure 5 is a view of the final product, as it appears from the outside, this view being on a reduced scale with respect to Figures 1–4; and Figure 6 is an end view of Figure 5.

The wound condenser body shown in Figure 1 is substantially cylindrical in shape, and is usually no more than a fraction of an inch in diameter and not more than two inches, sometimes considerably less than an inch, in length. The body can be formed in any well-known manner, as by interwinding a strip of conductive material 10, such as metallic foil, with a similar metal strip 11 and with spacing layers of paper or equivalent insulating material, one of which appears on the outside of the rolled body and is designated 12; the conductive strips 10 and 11 being laterally offset with respect to each other, so that they are in insulated relation and constitute the two plates of an electrical capacitor. Or, if desired, an equivalent result can be achieved by suitably interwinding metalized paper strips.

Whatever the method of initially forming the condenser body may be, metallic connectors 13 and 14 are joined to the oppositely arranged foil masses at the opposite ends of the body, and it is common practice to twist each connecting wire into a sort of loop which lies flatwise against the corresponding end of the wound body and is soldered thereto.

As a first step in practicing the present invention, the body of Figure 1 is supported in a mold which consists of the opposed mold sections 15 and 16. These sections define a mold cavity 17 within which the condenser body is supported, as indicated. The connectors 13 and 14 are mounted in cores 18 and 19, respectively, whose ends abut against the ends of the condenser body. The cores 18 and 19 are provided with longitudinal bores 20 into which the connectors 13 and 14 extend.

The mold sections 15 and 16 and the cores 18 and 19 may be composed of any suitable material capable of withstanding the temperatures and pressures involved in producing the desired mold. It will be understood, also, that the techniques involved in forming the mold sections, forming and mounting the cores therein, providing for the connection and separation of the mold sections, providing for the introduction of the material to be molded, etc., are so well-known that the depiction or enumeration of details is not necessary. Suffice it to point out that after the thermosetting material has been introduced into the mold cavity 17 and allowed to set, and after the mold sections and cores have been removed, the condenser body is encased within an enclosure 21, as shown in Figure 3. This enclosure has annular openings 22 and 23 surrounding the connectors 13 and 14 respectively. The shapes and dimensions of these openings, and the thickness of the molded casing 21, will correspond to the contours and dimensions of the mold cavity 17 and of the cores employed; and these, in turn, will depend upon the nature of the capacitor desired. Under certain circumstances the thickness of the enclosure 21 may be quite small, of the order of 1/16 of an inch, possibly less. The openings 23, 23 may be as little as 1/8 inch in diameter, in the usual case. The present drawings are not intended to be drawn to scale.

A characterizing feature of the invention resides in the fact that the plastic material employed for producing the enclosure 21 is a material which is chosen without regard to its temperature coefficient or expansion, and primarily for its ability to set relatively quickly and to be molded under relatively low pressures. Illustrative of the plastic materials which meet these rquirements, and which have been satisfactorily employed in practice, are the alkyd resins and the polyester resins. For example, I have satisfactorily employed an alkyd resin currently available on the market under the name "Plaskon," which is thermosetting, which can be molded at a pressure between 200 and 600 pounds per square inch, at a temperature of between 300° and 320° F., in a period less than 50 seconds. These pressures are uninjurious to the ordinary wound condenser body, and subject the body to none of the injurious deformations which would be likely to take place if, for example, a phenol-formaldehyde resin were employed, requiring a molding pressure of the order of 5,000 pounds per square inch.

Another plastic material which has produced good results is a polyester resin of thermosetting character adapted to be molded at a pressure between 50 and 150 pounds per square inch, at a temperature between 275° and 350° F., and to set within 15 to 60 seconds. This material has a relatively high temperature coefficient of expansion, approximately 0.00005 per degree F., but by virtue of the two-stage nature of the present procedure, and the excellent bonding characteristic of the end fill or plug to be employed, this high coefficient of expansion is of no significance. In fact, it is somewhat of advantage, because a material having a relatively high coefficient of expansion is easier to mold, since it tends to pull away from the mold as it cools and sets.

Other plastic materials having similar physical properties and molding capabilities may be used. In each case, the molding temperatures, times and pressures will correspond to the qualities and abilities of the plastic material employed.

The partially completed capacitor of Figure 3 is now ready for the drying and impregnation procedures. These are well known in the art of making electrical capacitors. Usually the bodies to be treated are first subjected to a drying period of about 12 hours in a chamber or oven heated to approximately 125° C,. under normal atmospheric pressure. Then they are subjected to a vacuum of the order of 500 microns of mercury for another period of about 12 hours, while the temperature is maintained at 120°; and by that time it is generally considered that substantially all of the moisture and volatile gases in the condenser bodies have been eliminated.

While still maintaining the temperature the desired impregnating material is introduced into the treatment chamber, either in molten condition or (dependent upon the impregnant used) in its normal liquid state, and the vacuum may be discontinued and replaced by pressure, if desired. After a period of from 6 to 12 hours, the impregnation procedure is usually complete, and the impregnated bodies may be removed from the treatment chamber. Any of the usual impregnants may be used, such as mineral waxes, mineral oils, silicones, chlorinated diphenyls, vegetable oils such as castor oil, and the like.

The drying and impregnation procedure affects the encased condenser body through the access openings 22 and 23.

As a final step in production of the present capacitor unit, the openings 22 and 23 are plugged, as indicated at 24 in Figures 4 and 6. The selection of the plugging material is one of the features of the present invention. This plastic material is deliberately chosen for its relatively low temperature coefficient of expansion, and for its ability to set without any applied pressure and to adhere well to the plastic casing 21 and also to the connectors 13 and 14. The plugging material used should be one which hardens to form a thermosetting compound without the evolution or water or volatile matter, and which has great adhesive properties toward metal and plastics. Illustrative of the plastic materials having these properties is the ethoxyline resin currently available on the market under the name "Araldite." This is a so-called "casting resin," requiring the application of no pressure in order to cause it to set. It adheres well to the adjacent plastic material forming the main body of the enclosure, and it adheres well to the projecting metal conductors 13, 14. Its coefficient of expansion is low and its moisture resistance properties are so good that a firm and permanent leak-proof bond exists in each of the critical regions, making the resultant capacitor highly resistant to moisture and thermal shocks. Capacitors produced in accordance with the present invention may be exposed to high temperatures and high humidity conditions for long periods of time without failure.

While the invention is primarily useful in connection with the production of sealed capacitor units of the kind herein illustrated and described, certain phases of the invention may obviously have wider applicability to encased electrical units generally, in which connectors project outwardly, in analogous fashion, from an enclosed electrical unit.

In general, it is to be understood that many of the details herein described and illustrated are subject to variation by those skilled in the art without necessarily involving a departure from the spirit and scope of the invention. It is intended, therefore, that these details be considered as being merely illustrative, and not of a limiting nature.

Having thus described and illustrated my invention what I claim and desire to secure by Letters Patent is:

1. In a method of producing a sealed capacitor consisting of a condenser body enclosed within a plastic casing and provided with connectors projecting out through said casing: the steps which consist in molding a plastic material about a condenser body to encase it completely except for annular openings surrounding said connectors, said plastic material being chosen without regard to its temperature coefficient of expansion and primarily for its ability to set relatively quickly and to be molded under relatively low pressures uninjurious to the condenser body, then subjecting the encased body, through said openings, to a drying treatment and to impregnation with a dielectric, and finally plugging said openings with a plastic material having a relatively low temperature coefficient of expansion and adapted to set without applied pressure and to adhere well to the first plastic material and to said connectors.

2. The procedural steps defined in claim 1, said first-named plastic material being chosen from the group which consists of the alkyd resins and the polyester resins.

3. The procedural steps defined in claim 1, said second-named plastic material being an ethoxyline resin.

4. The procedural steps defined in claim 1, said first-named plastic material being chosen from the group which consists of the alkyd resins and the polyester resins, said second-named plastic material being an ethoxyline resin.

References Cited in the file of this patent

UNITED STATES PATENTS

| | | |
|---|---|---|
| 1,333,004 | Vaughn | Mar. 9, 1920 |
| 1,934,192 | Houck | Nov. 7, 1933 |
| 1,973,038 | Benedek | Sept. 11, 1934 |
| 2,181,695 | Given | Nov. 28, 1939 |
| 2,526,688 | Robinson | Oct. 24, 1950 |
| 2,549,770 | Burnham | Apr. 24, 1951 |
| 2,577,005 | Giacomo | Dec. 4, 1951 |
| 2,596,134 | Dorst | May 13, 1952 |
| 2,622,133 | Dorst | Dec. 16, 1952 |
| 2,634,315 | Allison | Apr. 7, 1953 |

OTHER REFERENCES

Javitz: "Electrical Manufacturing," September 1951, pages 103–118.